Oct. 13, 1936.  J. P. CORDOVA  2,057,328
SECTIONAL CABLE SUSPENSION ASSEMBLY
Filed July 2, 1934  3 Sheets-Sheet 2

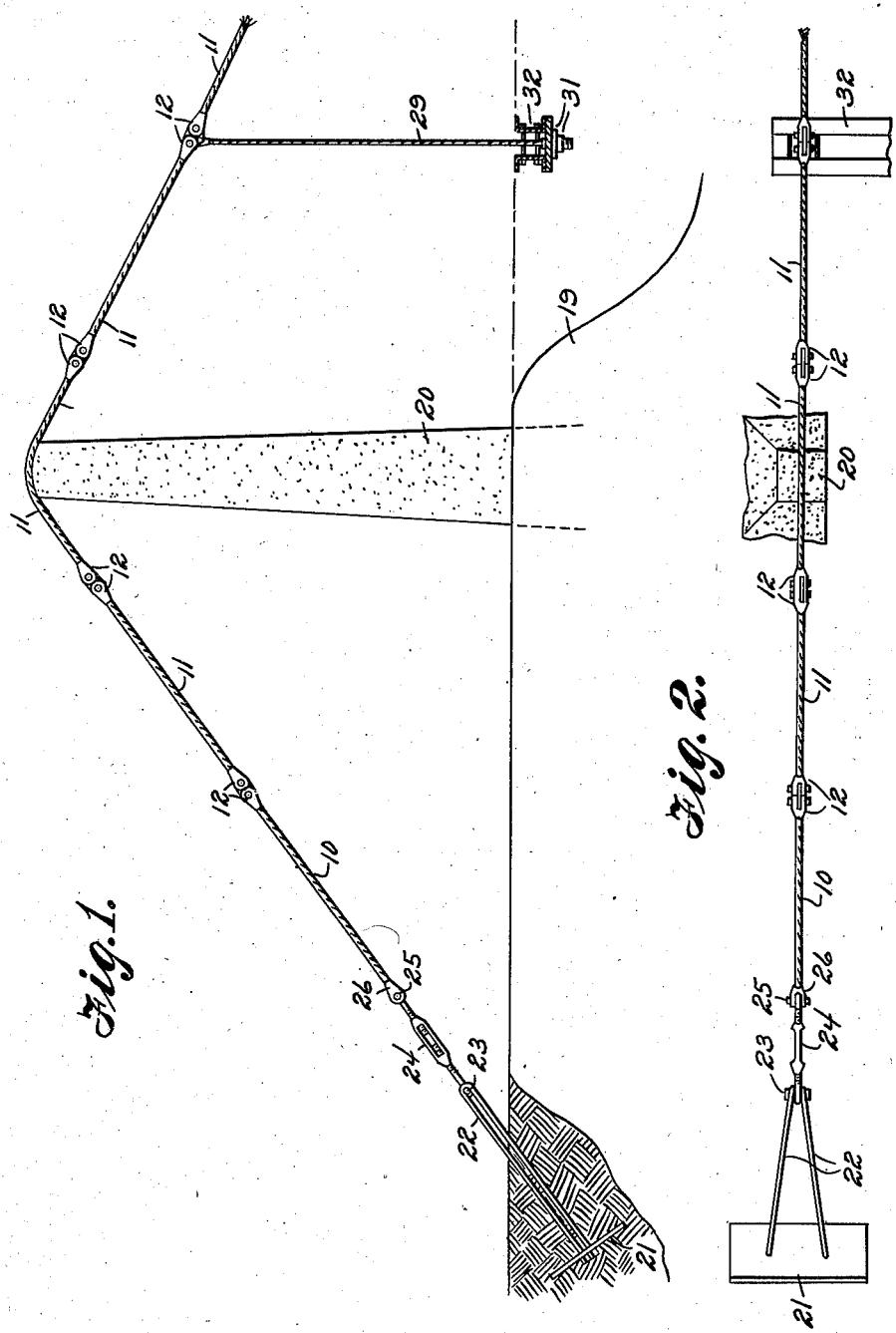

Joaquin Pedrero Cordova
INVENTOR
BY Victor J. Evans & Co.
ATTORNEY

Oct. 13, 1936. J. P. CORDOVA 2,057,328
SECTIONAL CABLE SUSPENSION ASSEMBLY
Filed July 2, 1934 3 Sheets-Sheet 3

Joaquin Pedrero Cordova
INVENTOR
BY Victor J. Evans & Co.
ATTORNEY

Patented Oct. 13, 1936

2,057,328

UNITED STATES PATENT OFFICE 2,057,328

SECTIONAL CABLE SUSPENSION ASSEMBLY

Joaquin Pedrero Cordova, Lomas de Chapultepec, Mexico

Application July 2, 1934, Serial No. 733,508
In Mexico November 16, 1933

1 Claim. (Cl. 14—22)

The invention relates to sectional cable suspension assembly and more especially to sectional cable fittings for suspension or hanging bridges.

In the construction of bridges, and particularly those known as suspension or hanging bridges, one of the difficulties encountered in the construction thereof is the transportation of the necessary materials to the point of erection, for generally the routes, roadways or railroads, do not lend immediate approach, and especially at the beginning of the erection period, and the location, whether ravine or river, is inaccessible for bringing large reels of cable on account of their volume and weight.

Another difficulty in this type of construction work is in the fastening of the cables to the posts or anchors and the passing of such cables from one bank to the other, especially where a considerable span is required as generally happens in the erection of hanging or suspension bridges. In such event there are required pontoons and the use of machinery and other resources that augment the difficulties and the cost in erection. The fastening of the pendulum or suspender cable with multiple parts entails difficulty and considerable inaccuracy, so that the contractors or artificers must work like arcobats in constant danger of losing their lives.

Therefore, one of the primary objects of this invention is the provision of a suspension assembly which overcomes the difficulties enumerated and at the same time minimizes the cost of erection, particularly by reducing considerably the number of parts for the fastening of the cables and the accurate placing thereof in their proper locations.

Another object of the invention is the provision of an assembly of this character, wherein the same involves lengths of sections of cables, these being coupled with each other to assure firmness and security and yet permitting flexing when required, and thus eliminating the use of continuous cables as is common in the erection of suspension bridges.

A further object of the invention is the provision of an assembly of this character which is comparatively simple in its make-up, thoroughly reliable and effective for the purpose intended thereof, strong, durable, and inexpensive in installation, as well as in the manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 1 is a fragmentary elevation of the sectional cable suspension assembly constructed in accordance with the invention, a portion of the foundation being broken away for illustrating details.

Figure 2 is a top plan view thereof.

Similar reference characters indicate corresponding parts throughout the several views in the drawings.

Figure 3:
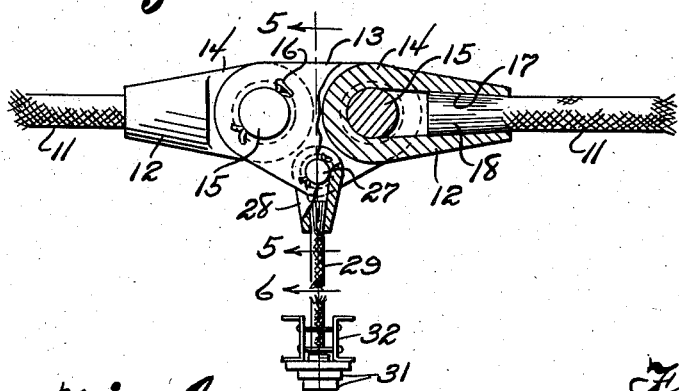
Figure 3 is a detail side elevation partly in section of one of the couplings between the cable sections.
Figure 5:
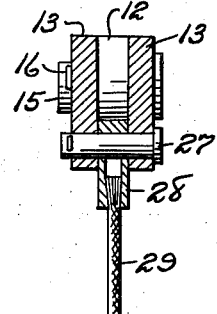
Figure 5 is a sectional view on the line 5—5 of Figure 1 looking in the direction of the arrows.
Figure 4:
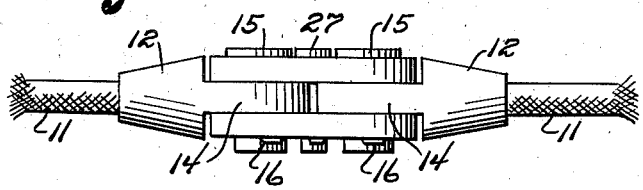
Figure 4 is a top plan view thereof.
Figure 6:
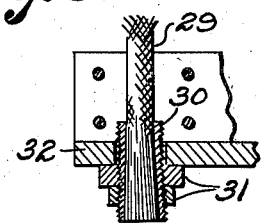
Figure 6 is a sectional view on the line 6—6 of Figure 3 looking in the direction of the arrows.

Referring to the drawings in detail, particularly Figures 1 to 6 inclusive, the sectional cable suspension assembly embodying the present invention comprises a plurality of end and intermediate lengths of sections of cables 10 and 11, respectively, each being of any required length to assure the erection of a suspension or hanging bridge. These intermediate lengths of sections 11 of cables are preferably joined with each other and one thereof with the end cable 10 through the instrumentality of couplings, each being hereinafter fully described.

Each coupling comprises a pair of oppositely arranged reversely tapered terminal connector links 12 and a pair of intermediate joining links 13, respectively, the latter being disposed on opposite sides of the eyes 14 of said links 12 and each is of substantially triangular shape. Passed transversely through the links 13 and the eyes 14 are separable pivot bolts 15 carrying cotter pins 16 for the securing of such bolts in connected relation to the links 13, so that a flexing coupler is had. The terminal connector links 12 are formed with outwardly tapered sockets 17 for accommodating and wedging the correspondingly tapered ends 18 of the sections 10 and 11, so that a perfectly secure and firm connection will be had between the cable sections 10 and 11 and each coupling having the links 12 and 13.

At each bank 19 of a ravine or river course is firmly installed a vertical upright, post or column 20 over which is bridged one of the sections 11 of the cable, while buried within the foundation or soil of the bank 19 is a rectangular-shaped anchoring plate 21 having bolted or otherwise secured thereto angularly disposed forwardly converging links 22, these in their angular disposition being extended above the top surface of the bank 19 for their connection, through the medium of a cross pivot 23, with a turnbuckle 24, this being also pivoted, at 25, to a terminal coupling 26 joined with the end section 10 of the cable assembly, and in this fashion the sectional cable assembly has anchorage with the bank 19, the turnbuckle 24 being adapted to give slack or taut to the assembly.

At a selected coupling between the intermediate sections 11 of cables and engaged with the pair of links 13 thereof, intermediate of their lengths and below the pivot bolts 15, is a suspension bolt 27 upon which is pivoted a terminal connector 28 for a suspender cable 29 which, at its lowermost end, has securely fitted therewith an externally threaded sleeve or hollow bolt 30 carrying jamb nuts 31, these forming a bearing for a platform sill or beam 32 for the suspension or hanging bridge, it being understood, of course, that there may be employed the required number of suspender cables 29 for maintenance of the platform of the bridge under the erection thereof.

Figure 7:
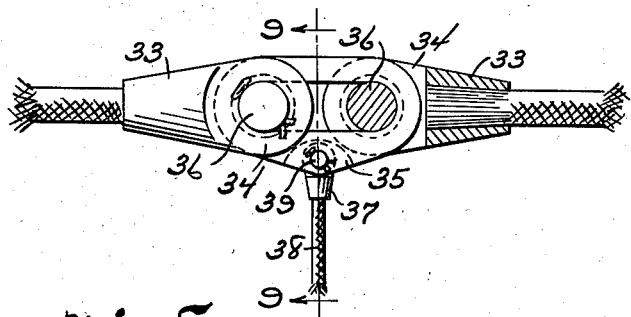
Figure 7 is a view similar to Figure 3 showing a slight modification.
Figure 9:
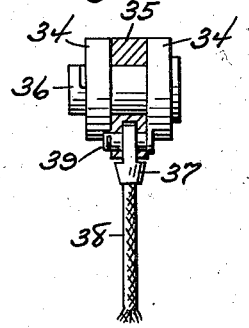
Figure 9 is a sectional view on the line 9—9 of Figure 7 looking in the direction of the arrows.
Figure 8:
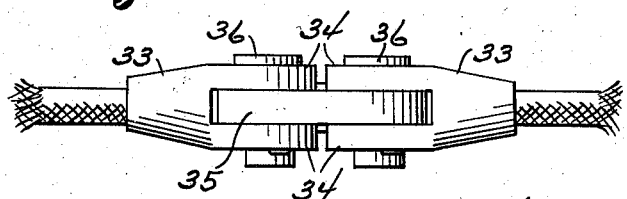
Figure 8 is a top plan view thereof.

In Figures 7, 8 and 9 of the drawings there is shown a modified form of coupling for the cable sections, wherein the terminal connector links 33 are formed with the pair of spaced eyes 34 for accommodating therebetween a single cutting link 35, this being pivoted by pivot bolts 36 passed transversely through the eyes and said link. To this single link 35 is attached a terminal coupling 37 having the suspender cable 38, the coupling being pivoted, at 39, to the link 34 intermediate of its length.

Figure 10:
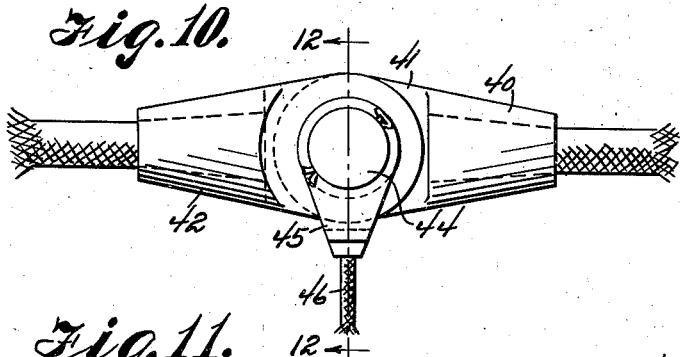
Figure 10 is a side elevation of a further modified form of coupling.
Figure 12:
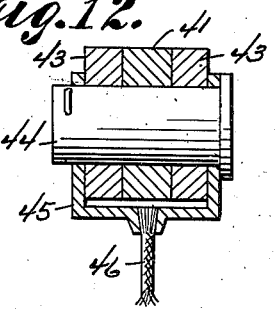
Figure 12 is a sectional view on the line 12—12 of Figure 10 looking in the direction of the arrows.
Figure 11:
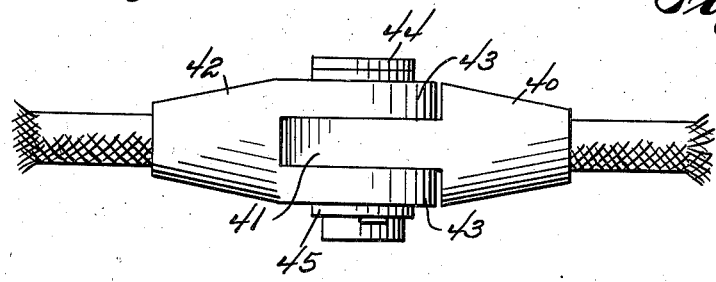
Figure 11 is a top plan view thereof.

In Figures 10, 11 and 12 of the drawings there is shown a further modified form of sectional cable coupling, wherein one terminal connector link 40 is formed with a single eye 41, while the other terminal connector link 42 is formed with a pair of spaced eyes 43, the eye 41 being interfitted between the eyes 43 and such eyes pivotally joined through a pivot bolt 44 passed transversely therethrough. This pivot bolt 44 has swingingly connected therewith a suspension strap 45 carrying the suspender cable 46.

Figure 13:
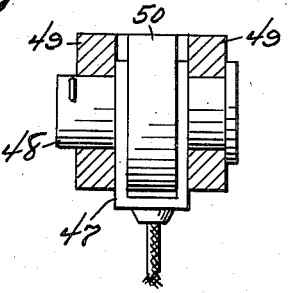
Figure 13 is a vertical transverse sectional view through a further modified form of coupling.

In Figure 13 of the drawings there is shown a further modification of coupling, wherein the suspension strap 47 is connected with the pivot bolt 48 and interfitted between the eyes 49 and 50, respectively, of the coupling, while the strap 45 in Figures 10, 11 and 12 is arranged outside of the eyes 41 and 43.

Figure 14:
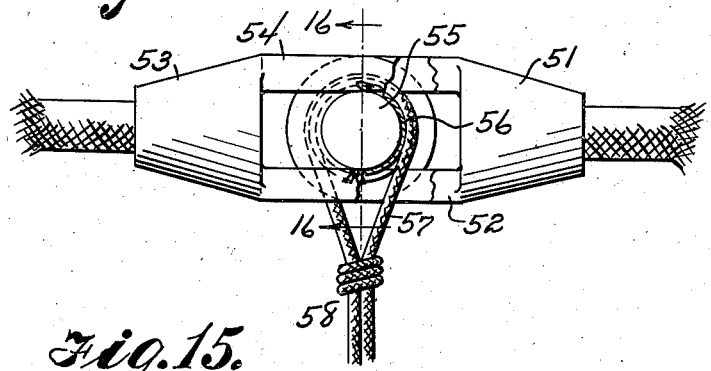
Figure 14 is a view similar to Figure 10 showing a still further modified form of coupling.
Figure 16:
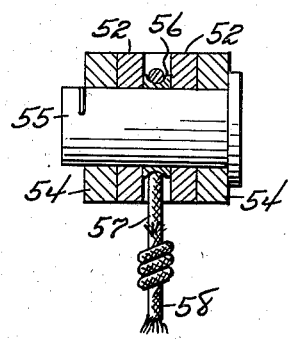
Figure 16 is a sectional view on the line 16—16 of Figure 14 looking in the direction of the arrows.
Figure 15:
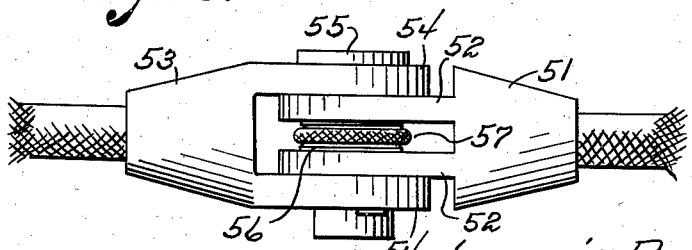
Figure 15 is a top plan view thereof.

In Figures 14, 15 and 16 of the drawings there is shown a still further modification of coupling, wherein the terminal connector link 51 has the pair of spaced eyes 52 and the terminal connector link 53 has the pair of spaced eyes 54, these spreading the eyes 52, and such pairs of eyes 52 and 54 are connected through a pivot bolt 55. Between the pair of eyes 52 is arranged a pulley 56 having about the same the loop 57 of a suspender cable 58.

What is claimed is:

In a sectional cable assembly for hanging bridges supporting cables having anchored ends and means for adjustably securing such cables to their anchors, said supporting cables comprising a plurality of sections, sockets in which the ends of the cable sections are secured and eyes formed on the outer ends of said sockets, joining links in contact with the outer faces of the eyes and pivoted to such eyes, suspender cables each having a connector at one of its ends received between and pivotally secured to the links, an exteriorly threaded sleeve in which the second end of each of the suspending cables is secured, platform sills having openings for the passage of the sleeves therethrough, and jamb nuts screwed on the sleeves contacting with and holding the sills adjustably positioned on the suspender cables.

JOAQUIN PEDRERO CORDOVA.